United States Patent
Liu et al.

(10) Patent No.: US 9,678,813 B2
(45) Date of Patent: Jun. 13, 2017

(54) METHOD, APPARATUS, AND SYSTEM FOR MUTUAL COMMUNICATION BETWEEN PROCESSES OF MANY-CORE PROCESSOR

(71) Applicant: Huawei Technologies Co., Ltd., Shenzhen (CN)

(72) Inventors: Tanyi Liu, Shenzhen (CN); Youliang Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 14/725,066

(22) Filed: May 29, 2015

(65) Prior Publication Data
US 2015/0261588 A1    Sep. 17, 2015

Related U.S. Application Data

(63) Continuation of application No. PCT/CN2013/074709, filed on Apr. 25, 2013.

(30) Foreign Application Priority Data

Nov. 30, 2012 (CN) .......................... 2012 1 0505157

(51) Int. Cl.
*G06F 3/00* (2006.01)
*G06F 9/44* (2006.01)
(Continued)

(52) U.S. Cl.
CPC .............. *G06F 9/546* (2013.01); *G06F 9/467* (2013.01); *G06F 9/54* (2013.01)

(58) Field of Classification Search
CPC ...................................................... G06F 9/546
(Continued)

(56) References Cited

U.S. PATENT DOCUMENTS 6,938,253 B2    8/2005    Kim
7,890,488 B2    2/2011    Baeza-Yates et al.
(Continued)

FOREIGN PATENT DOCUMENTS

CN    100424675 C    10/2008
CN    100471180 C    3/2009
(Continued)

OTHER PUBLICATIONS

Foreign Communication From a Counterpart Application, Chinese Application No. 201210505157.0, Chinese Office Action dated Jun. 29, 2016, 7 pages.
(Continued)

*Primary Examiner* — Timothy A Mudrick
(74) *Attorney, Agent, or Firm* — Conley Rose, P.C.

(57) ABSTRACT

A method, an apparatus, and a system for mutual communication between processes of a many-core processor are provided that relate to the field of many-core operating systems The method is executed by a target kernel, where the target kernel corresponds to a target processor core. The method includes acquiring a message header of a message from a quick message channel (QMC); executing a central processing unit (CPU) pre-fetching command according to the message header, so that a message body that is in the message stored in a shared memory and corresponds to the message header is loaded to a cache that corresponds to the target processor core; and switching to a target process, so that the target process acquires the message body from the cache. The embodiments of the present invention apply to a scenario of mutual communication between processes of a many-core processor.

22 Claims, 8 Drawing Sheets

(51) Int. Cl.
*G06F 9/46* (2006.01)
*G06F 13/00* (2006.01)
*G06F 9/54* (2006.01)

(58) Field of Classification Search
USPC .......................................................... 719/314
See application file for complete search history.

(56) References Cited

U.S. PATENT DOCUMENTS

| | | | |
|---|---|---|---|
| 7,928,763 | B2 | 4/2011 | Vorbach |
| 7,950,012 | B2 | 5/2011 | Tirumalai et al. |
| 7,953,685 | B2 | 5/2011 | Liu et al. |
| 8,108,863 | B2 | 1/2012 | Rakvic et al. |
| 8,122,132 | B2 | 2/2012 | Arimilli et al. |
| 8,196,147 | B1 | 6/2012 | Srinivasan et al. |
| 2005/0058119 | A1 | 3/2005 | Inouchi et al. |
| 2008/0107115 | A1 | 5/2008 | Cai |
| 2010/0284404 | A1* | 11/2010 | Gopinath .............. G06F 9/5005 370/392 |
| 2012/0210071 | A1* | 8/2012 | Black .................. G06F 15/167 711/130 |

FOREIGN PATENT DOCUMENTS

| | | | |
|---|---|---|---|
| CN | 101448018 | A | 6/2009 |
| CN | 102622329 | A | 8/2012 |
| CN | 102779110 | A | 11/2012 |
| WO | 02088936 | A1 | 11/2002 |

OTHER PUBLICATIONS

Partial English Translation and Abstract of Chinese Patent Application No. CN101448018A, May 6, 2015, 4 pages.

Peter, S., et al., "Early experience with the Barrelfish OS and the Single-Chip Cloud Computer," Proceedings of the 3rd Intel Multicore Applications Research Community Symposium, Jul. 2011, 5 pages.

Foreign Communication From a Counterpart Application, European Application No. 13859349.6, Extended European Search Report dated Jun. 25, 2015, 7 pages.

Foreign Communication From a Counterpart Application, PCT Application No. PCT/CN2013/074709, English Translation of International Search Report Dated Sep. 5, 2013, 2 pages.

Foreign Communication From a Counterpart Application, PCT Application No. PCT/CN2013/074709, English Translation of Written Opinion Dated Sep. 5, 2013, 7 pages.

Foreign Communication From a Counterpart Application, European Application No. 13859349.6, European Oral Proceedings dated Jan. 27, 2017, 7 pages.

* cited by examiner

METHOD, APPARATUS, AND SYSTEM FOR MUTUAL COMMUNICATION BETWEEN PROCESSES OF MANY-CORE PROCESSOR

CROSS-REFERENCE TO RELATED APPLICATIONS

This application is a continuation of International Application No. PCT/CN2013/074709, filed on Apr. 25, 2013, which claims priority to Chinese Patent Application No. 201210505157.0, filed on Nov. 30, 2012, both of which are hereby incorporated by reference in their entireties.

TECHNICAL FIELD

The present invention relates to the field of many-core operating systems, and in particular to a method, an apparatus, and a system for mutual communication between processes of a many-core processor.

BACKGROUND

With rapid development of mobile communication technologies, people have an increasingly-urgent requirement for high performance, high speed, and low delay of a communication system, and therefore raise an increasingly-higher requirement for a processor of an electronic device. The processor of an electronic device has developed from single-core to multiple-core and then to many-core. A many-core processor uses a non-cache-coherent architecture and a multi-kernel operating system (multi-kernel OS). Various processes of a many-core processor communicate with each other by means of message transmission.

In the prior art, inter-core communication is implemented by a shared memory, polling, and Inter-Process Interrupt (IPI) on a non-cache-coherent many-core processor platform. A shared memory is split into multiple blocks that have a same size as a cache line. A transmit end places a message body into the shared memory, places a channel identifier (channel ID) that includes memory address information into a Message Passing Buffer (MPB), and instructs a receive end through the IPI to obtain the channel ID from the MPB. Finally, a user-layer application at the receive end reads the message body from the shared memory.

In the process of implementing the foregoing inter-core communication, the inventor has discovered that the prior art at least has the following problem. The user-layer application needs to read the message body from the shared memory, thereby decreasing the speed of reading the message body and degrading user experience.

SUMMARY

Embodiments of the present invention provide a method, an apparatus, and a system for mutual communication between processes of a many-core processor, so as to increase the speed of reading a message body and enhance user experience.

The embodiments of the present invention provide the following technical solutions to attain the foregoing objectives.

According to a first aspect, an embodiment of the present invention provides a method for mutual communication between processes of a many-core processor, where the method is executed by a target kernel, the target kernel corresponds to a target processor core, and the method includes acquiring a message header of a message from a quick message channel (QMC); executing a central processing unit (CPU) pre-fetching command according to the message header, so that a message body that is in the message stored in a shared memory and corresponds to the message header is loaded to a cache that corresponds to the target processor core; and switching to a target process, so that the target process acquires the message body from the cache.

In a first possible implementation manner, the message header includes a start address of the message body stored in the shared memory and a size of the message body, where the start address and the size of the message body are used to indicate the message body stored in the shared memory; or the message header includes a start address and an end address of the message body stored in the shared memory, where the start address and the end address are used to indicate the message body stored in the shared memory.

In a second possible implementation manner, with reference to the first aspect or the first possible implementation manner of the first aspect, the message header includes identity information, where the identity information is used to identify that the message body of the message is transmitted through the QMC.

In a third possible implementation manner, with reference to the second possible implementation manner of the first aspect, before executing the CPU pre-fetching command according to the message header, the method further includes detecting whether the message header includes the identity information; and executing the CPU pre-fetching command according to the message header includes executing the CPU pre-fetching command according to the message header if it is detected that the message header does not include the identity information.

In a fourth possible implementation manner, with reference to the first aspect, the first possible implementation manner of the first aspect, the second possible implementation manner of the first aspect, or the third possible implementation manner of the first aspect, the message header includes a first target process identity used to identify the target process that corresponds to the message header; before acquiring the message header of the message from the QMC, the method further includes receiving a first interrupt triggering signal sent by a source kernel; performing first interrupt processing according to the first interrupt triggering signal, and in the process of performing the first interrupt processing, reading the message header from the QMC and placing, according to the first target process identity in the message header, the message header into a message receiving queue corresponding to the target process; and performing process scheduling after exiting the first interrupt processing; and acquiring the message header of the message from the QMC includes acquiring the message header from the message receiving queue corresponding to the target process when the target process is being scheduled.

In a fifth possible implementation manner, with reference to the third possible implementation manner of the first aspect, the method includes switching to the target process if it is detected that the message header includes the identity information, so that the target process acquires, from the QMC, the message body corresponding to the message header in the message.

In a sixth possible implementation manner, with reference to the fifth possible implementation manner of the first aspect, the message header further includes a second target process identity; before acquiring the message header of the message from the QMC, the method includes receiving a second interrupt triggering signal sent by the source kernel; performing second interrupt processing according to the second interrupt triggering signal, and in the process of performing the second interrupt processing, reading the message header and the message body from the QMC and placing, according to the second target process identity in the message header, the message header and the message body into a message receiving queue corresponding to the target process; and performing process scheduling after exiting the second interrupt processing; and switching to the target process if it is detected that the message header includes the identity information, so that the target process acquires, from the QMC, the message body corresponding to the message header in the message includes, if it is detected that the message header includes the identity information, switching to the target process when the target process is being scheduled, so that the target process acquires the message body from the message receiving queue that corresponds to the target process.

In a seventh possible implementation manner of the first aspect, with reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, the message body is sent by a source processor core by using the following method detecting whether the size of the message body is greater than the maximum payload that can be sent by the QMC; and if it is detected that the size of the message body is greater than the maximum payload that can be sent by the QMC, storing, by the source processor core, the message body into the shared memory; and storing, by the source kernel, information that is used to indicate the message body of the message stored in the shared memory as the message header into the QMC, and sending to the target kernel; if it is detected that the size of the message body is not greater than the maximum payload that can be sent by the QMC, storing, by the source kernel, the message body of the message into the QMC; and storing information that is used to indicate the message body of the message stored in the QMC as the message header into the QMC, and sending to the target kernel.

According to a second aspect, an embodiment of the present invention provides a many-core processor, including a source processor core and a target processor core, where the target processor core runs a target kernel and the target kernel includes an acquiring unit configured to acquire a message header of a message from a QMC; a command pre-fetching unit configured to execute a CPU pre-fetching command according to the message header acquired by the acquiring unit, so that a message body, of the message, that is stored in a shared memory and corresponds to the message header is loaded to a cache that corresponds to the target processor core; and a process switching unit configured to switch to a target process after the command pre-fetching unit executes the CPU pre-fetching command, so that the target process acquires the message body from the cache.

According to a third aspect, an embodiment of the present invention provides a many-core processor system, including a source processor core, a target processor core, and a memory, where the memory is configured to store codes that are run by the source processor core and the target processor core; the target processor core is configured to read the codes stored in the memory, so that a target kernel executes the following method by running a kernel program: acquiring a message header of a message from a QMC; executing a CPU pre-fetching command according to the message header, so that a message body that is in the message stored in a shared memory and corresponds to the message header is loaded to a cache that corresponds to the target processor core; and switching to a target process, so that the target process acquires the message body from the cache.

The embodiments of the present invention provide a method, an apparatus, and a system for mutual communication between processes of a many-core processor. A target kernel of a target processor core acquires a message header from a QMC; executes, according to the acquired message header, a CPU pre-fetching command, instructing to load a message body to a cache that corresponds to the target processor core; and switches to a target process, so that the target process acquires the message body from the cache. In this way, during communication between processes, the message body is loaded to the cache, so that the target process may directly acquire the message body from the cache without the need of accessing a shared memory to acquire the message body, thereby increasing the speed of reading the message body and enhancing user experience.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
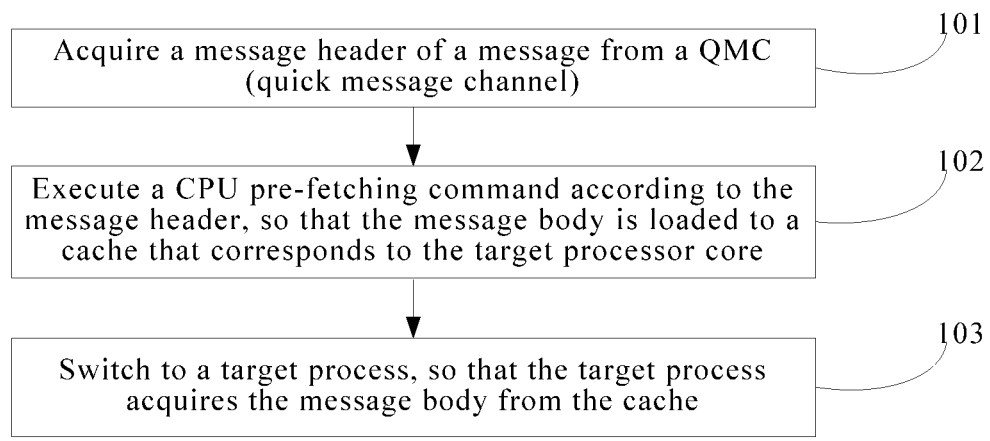
FIG. 1 is a schematic diagram of a method for mutual communication between processes of a many-core processor according to an embodiment of the present invention.

An embodiment of the present invention provides a method for mutual communication between processes of a many-core processor. The method is executed by a target kernel, where the target kernel corresponds to a target processor core. As shown in FIG. 1, the method includes the following steps.

101. Acquire a message header of a message from a QMC.

If a source kernel of the processor stores a message body of a message into a shared memory, the message header of the message is used to indicate the message body stored in the shared memory. In this case, the message header of the message includes a start address of the message body and a size of the message body stored in the shared memory, where the start address and the size of the message body are used to indicate the message body stored in the shared memory.

Optionally, the message header of the message includes a start address and an end address of the message body stored in the shared memory, where the start address and the end address are used to indicate the message body stored in the shared memory.

It should be noted that the message header may use other methods to indicate the message body stored in the shared memory, which is not restricted in the present invention.

Further, the message header further includes a first target process identity.

The first target process identity is used to identify the target process that corresponds to the message header.

It should be noted that each process has a corresponding process identity in all the embodiments of the present invention.

It should be noted that the target kernel is in a kernel state when the target kernel acquires the message header of the message from the QMC.

102. Execute a CPU pre-fetching command according to the message header, so that the message body that is in the message stored in a shared memory and corresponds to the message header is loaded to a cache that corresponds to the target processor core.

After the target kernel acquires the message header of the message, if the message header includes the start address of the message body and the size of the message body stored in the shared memory, the target kernel executes the CPU pre-fetching command according to the start address of the message body and the size of the message body stored in the shared memory, so that the target kernel loads the message body of the message from the shared memory to the cache that corresponds to the target processor core.

If the message header includes the start address and the end address of the message body stored in the shared memory, the target kernel executes the CPU pre-fetching command according to the start address and the end address of the message body stored in the shared memory, so that the target kernel loads the message body of the message from the shared memory to the cache that corresponds to the target processor core.

103. Switch to the target process, so that the target process acquires the message body from the cache.

The target kernel switches to the target process after the target kernel executes the CPU pre-fetching command; optionally, when the message body is loaded to the cache that corresponds to the target processor core, the target kernel switches to the target process simultaneously, so that the target process acquires the message body from the cache.

Further, that the target kernel switches to the target process includes that the target kernel switches from a kernel state to a user state.

This embodiment of the present invention provides a method for mutual communication between processes of a many-core processor. A target kernel of a target processor core acquires a message header from a QMC; executes, according to the acquired message header, a CPU pre-fetching command, instructing to load a message body to a cache that corresponds to the target processor core; and switches to a target process, so that the target process acquires the message body from the cache. In this way, during communication between processes, the message body is loaded to the cache, so that the target process may directly acquire the message body from the cache without the need of accessing a shared memory to acquire the message body, thereby increasing the speed of reading the message body and enhancing user experience.

An embodiment of the present invention provides a method for mutual communication between processes of a many-core processor. The method is executed by a target kernel and a source kernel, where the target kernel corresponds to a target processor core and the source kernel corresponds to a source processor core. The method includes the following steps.

201. A first process of the source processor core invokes a library function in an MsgLib to send a message.

When the first process needs to send a message to a target process of the target processor core, the first process needs to invoke the library function in the MsgLib.

Figure 2:
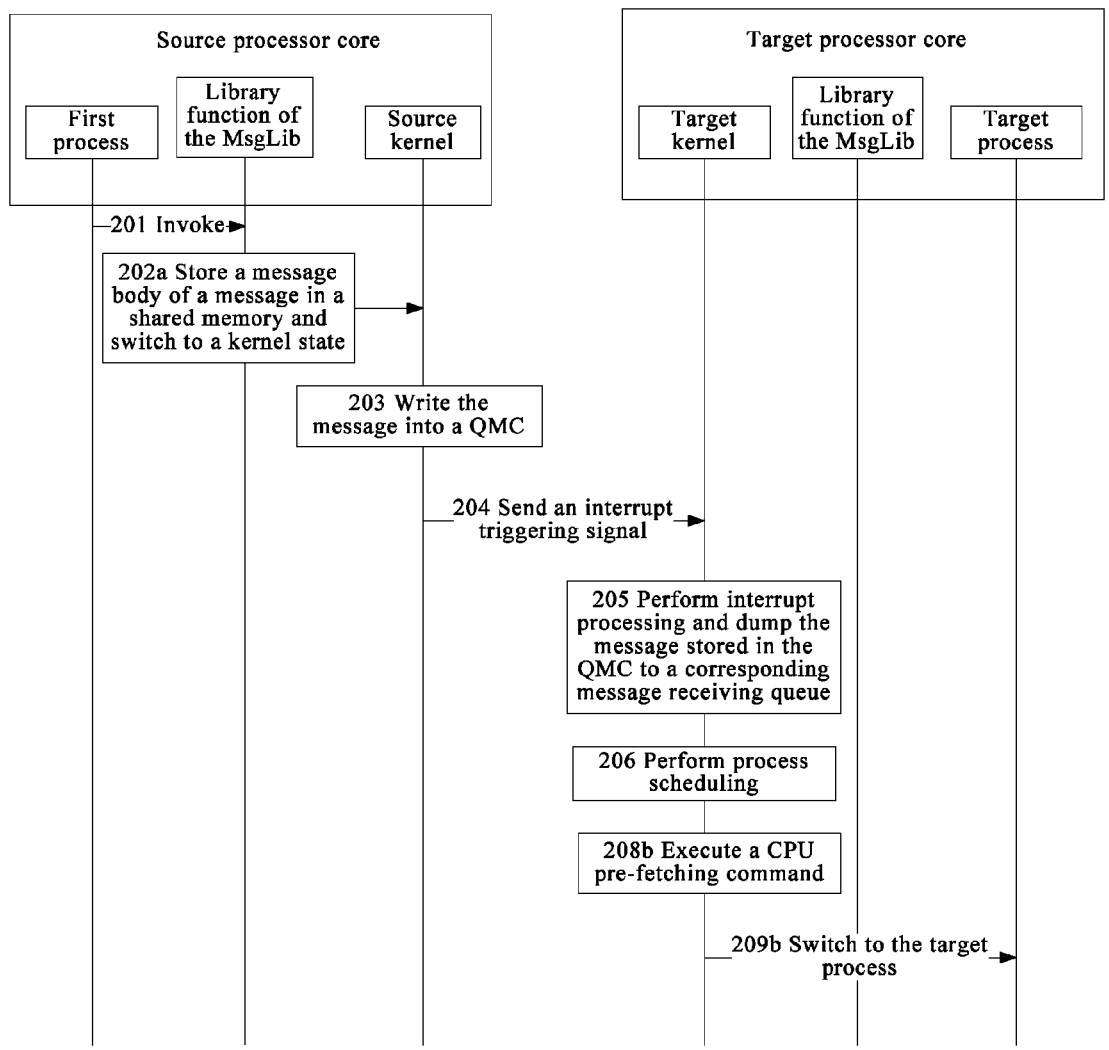
FIG. 2 is a schematic diagram of another method for mutual communication between processes of a many-core processor according to an embodiment of the present invention.
Figure 3:
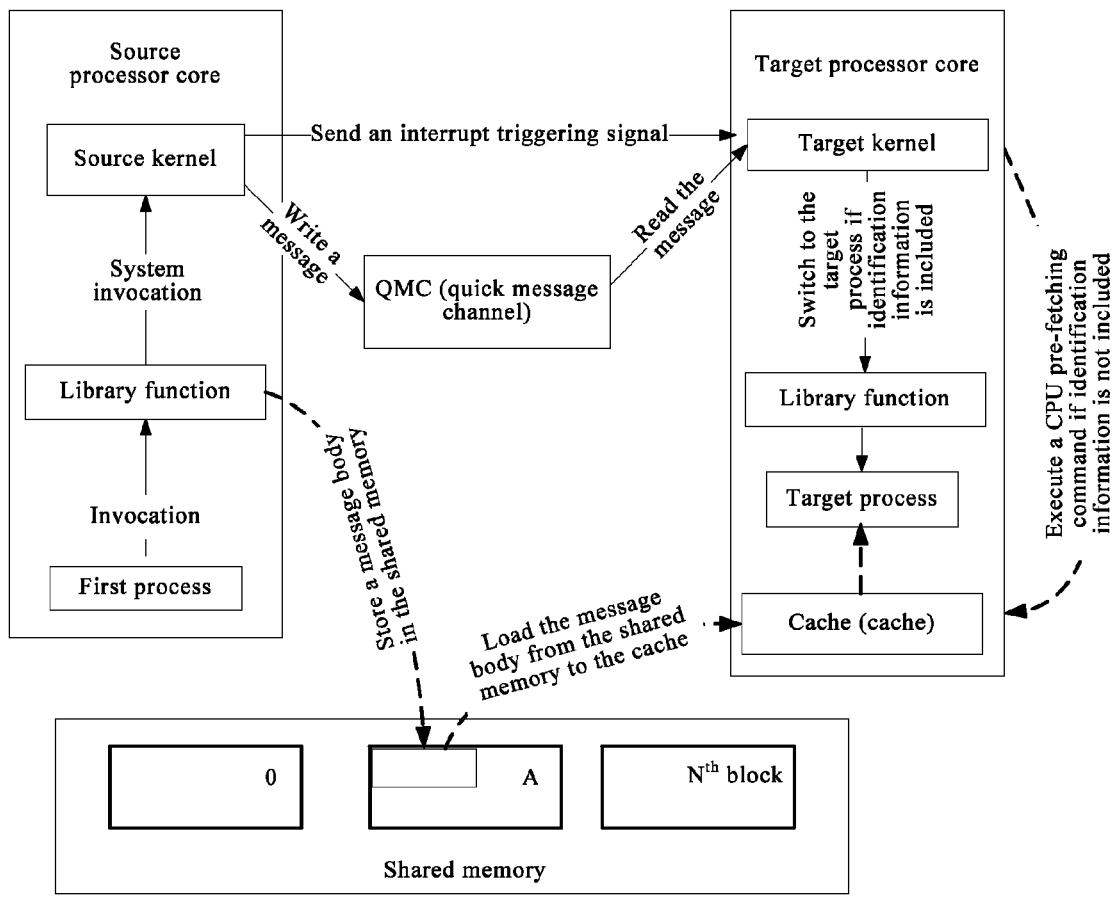
FIG. 3 is a schematic diagram of another method for mutual communication between processes of a many-core processor according to an embodiment of the present invention.
Figure 4:
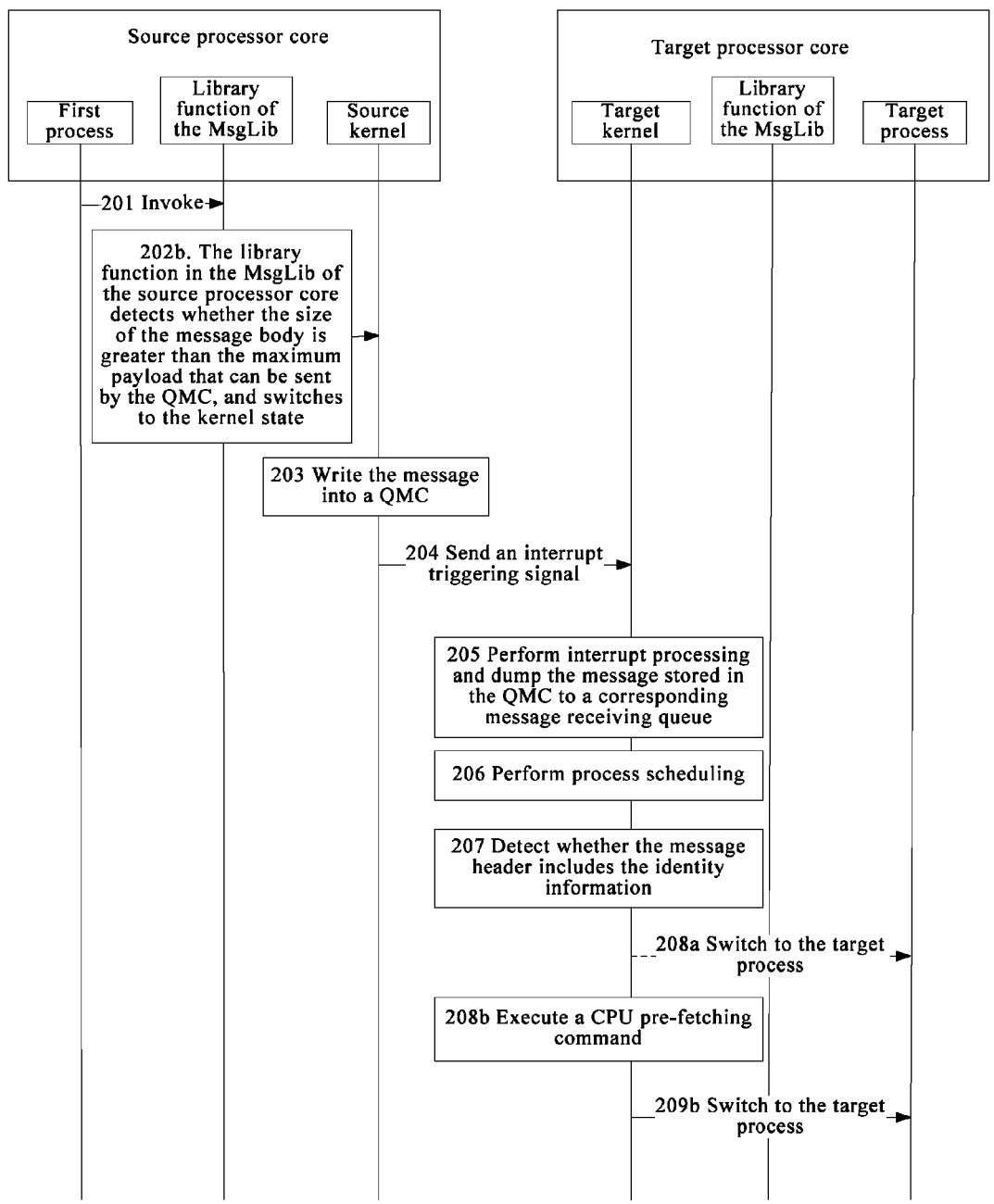
FIG. 4 is a schematic diagram of another method for mutual communication between processes of a many-core processor according to an embodiment of the present invention.

It should be noted that there are two methods for the source processor core to send a message to the target processor core. One is that the library function in the MsgLib of the source processor core does not detect a size of a message body of the message but directly stores the message body of the message into a shared memory, so that the target kernel acquires the message body of the message through the shared memory. If the source processor core uses this method, steps 202*a*, 203 to 206, and 208*b* to 209*b* are executed, as shown in FIG. 2 and FIG. 3. A second method is that the library function in the MsgLib of the source processor core detects the size of the message body of the message and stores the message body of the message according to a detection result. If the source processor core uses the second method, steps 202*b*, 203 to 207, and 208*a* are executed, or steps 202*b*, 203 to 207, and 208*b* to 209*b* are executed, as shown in FIG. 4 and with reference to FIG. 3.

202*a*. The library function in the MsgLib of the source processor core stores the message body of the message into the shared memory, and switches the source processor core to a kernel state.

After the library function in the MsgLib of the source processor core stores the message body of the message into the shared memory. The source processor core is switched from a user state to the kernel state by means of system invocation, and then the source kernel is accessed.

202*b*. The library function in the MsgLib of the source processor core detects whether the size of the message body is greater than the maximum payload that can be sent by the QMC, and switches the source processor core to the kernel state.

The maximum payload that can be sent by the QMC is preset. The maximum payload that can be sent by the QMC may be preset by using three methods, which are described as follows.

It should be noted that the many-core processor that implements communication between processes includes at least two processor cores. A determining processor core is a first processor core that is enabled after the many-core processor is started, may be the source processor core or the target processor core. After determining the maximum payload that can be sent by the QMC, the determining processor core sends, to another processor core, the determined maximum payload that can be sent by the QMC.

A first method of determining, by the determining processor core, the maximum payload that can be sent by the QMC is as follows.

The determining processor core determines that the amount of transmitted data of the QMC is equal to a size of a Cache Line; and then determines the maximum payload, which can be sent by the QMC, by using a formula $S_{payload}=S_{cache}-S_{addr}-S_{size}-S_{dstp}$, where $S_{cache}$ indicates bytes occupied by the amount of transmitted data of the QMC, $S_{addr}$ indicates bytes occupied by a start address of the shared memory, $S_{size}$ indicates bytes occupied by the size of the message body of the message, $S_{dstp}$ indicates bytes occupied by a target process identity, and $S_{payload}$ indicates bytes occupied by the maximum payload that can be sent by the QMC. In this case, the number of QMCs included in the determining processor core is $S_T/S_{cache}$, where $S_T$ is the number of bytes carried on a first channel. The first channel is a channel allocated to each processor core to transmit a message body.

It should be noted that the first channel is split into $S_T/S_{cache}$ QMCs in the preceding process.

It should be noted that one QMC is used during each time of message transmission in all embodiments of the present invention.

For example, it is assumed that the number of bytes carried on the first channel is 8 k, a size of the Cache Line is 32 bytes, Address occupies 5 bytes, the size of the message body occupies 1 byte, and the target process identity occupies 2 bytes. Then, the maximum payload that can be sent by the QMC is calculated as 24 bytes according to the formula $S_{payload}=S_{cache}-S_{addr}-S_{size}-S_{dstp}$; and the determining processor core may use $S_T/S_{cache}=8$ k/32=256 QMCs. That is, the first channel is split into 256 QMCs.

A second method of determining, by the determining processor core, the maximum payload that can be sent by the QMC is as follows.

The determining processor core determines the amount of transmitted data of the QMC according to a formula $$S_{chanel} = \left\lfloor \frac{S_T}{(N-1)*S_{cache}} \right\rfloor *S_{cache};$$

and then, determines the maximum payload, which can be sent by the QMC, by using a formula $S_{payload}=S_{chanel}-S_{addr}-S_{size}-S_{dstp}$.

$S_T$ indicates the number of bytes carried on a first channel; the first channel is a channel allocated to each processor core of the many-core processor to transmit a message body; N−1 indicates the number of QMCs; and $S_{cache}$ indicates bytes occupied by a Cache Line.

It should be noted that in this method, the many-core processor that implements communication between processes has at least two processor cores, so that one QMC is shared between every two processor cores. If the many-core processor has N processor cores, there are N−1 QMCs.

For example, if N is 48, the number of QMCs is 47, a size of the Cache Line is 32 bytes, Addr occupies 5 bytes, the size of the message body occupies 1 byte, a target process identity occupies 2 bytes, and the number of bytes carried on the first channel is 8192. Then, the amount of transmitted data of the QMC is determined as 160 bytes according to the formula $$S_{chanel} = \left\lfloor \frac{S_T}{(N-1)*S_{cache}} \right\rfloor *S_{cache};$$

and the maximum payload that can be sent by the QMC is determined as 152 bytes by using the formula $S_{payload}=S_{chanel}-S_{addr}-S_{size}-S_{dstp}$.

A third method of determining, by the determining processor core, the maximum payload that can be sent by the QMC is as follows.

The determining processor core splits a first channel into a part used for inter-kernel communication and a part used for inter-program communication; determines the amount of transmitted data of a QMC, which is used for the inter-kernel communication, according to a formula $$S_{chanel1} = \left\lfloor \frac{S_T * P_{kernel}}{(n-1)*S_{cache}} \right\rfloor *S_{cache};$$

and determines a maximum payload, which can be sent by a QMC used for the inter-kernel communication, according to a formula $S_{payload}=S_{chanel1}-S_{addr}-S_{size}-S_{dstp}$, where $P_{kernel}$ indicates a percentage of QMCs, used for the inter-kernel communication, of the determining processor core among QMCs of the first channel, and N−1 indicates the number of QMCs used for the inter-kernel communication.

Further, in this method, a manner of determining the number of QMCs for the inter-kernel communication is that one QMC is shared between every two processor cores when the many-core processor that implements communication between processes has at least two processor cores. For example, if the many-core processor has N processor cores, there are N−1 QMCs.

The determining processor core determines the amount of transmitted data of a QMC, used for the inter-program communication, of the determining processor core according to a formula $$S_{chanel2} = \left\lfloor \frac{S_T * (1-P_{kernel})}{M*S_{cache}} \right\rfloor *S_{cache};$$

and determines the maximum payload that can be sent by a QMC, used for the inter-program communication, of the determining processor core according to a formula $S_{payload}=S_{chanel2}-S_{addr}-S_{size}-S_{dstp}$, where M indicates the number of QMCs used for the inter-program communication.

It should be noted that in this method both $P_{kernel}$ and M are preset according to a requirement of a user.

For example, if N is 48, the number of QMCs used for the inter-kernel communication is 47; if 50% of the first channel is used for the inter-kernel communication, $P_{kernel}$ is 50%, a size of a Cache Line is 32 bytes, Addr occupies 5 bytes, the size of the message body occupies 1 byte, a target process identity occupies 2 bytes, and the number of bytes for the inter-kernel communication carried on the first channel is 8192. Then, the amount of transmitted data of a QMC used for the inter-kernel communication is determined as 64 bytes according to the formula $$S_{chanel1} = \left\lfloor \frac{S_T * P_{kernel}}{(N-1) * S_{cache}} \right\rfloor * S_{cache};$$

and the maximum payload that can be sent by a QMC used for the inter-kernel communication is determined as 56 bytes according to the formula $S_{payload} = S_{chanel1} - S_{addr} - S_{size} - S_{dstp}$.

It is assumed that M is 4. Then, the amount of transmitted data of a QMC used for the inter-program communication is determined as 1024 bytes according to $$S_{chanel2} = \left\lfloor \frac{S_T * (1 - P_{kernel})}{M * S_{cache}} \right\rfloor * S_{cache},$$

and the maximum payload that can be sent by a QMC used for the inter-program communication is determined as 1016 bytes according to the formula $S_{payload} = S_{chanel2} - S_{addr} - S_{size} - S_{dstp}$.

It should be noted that for the amount of data carried by first channels in at least two processor cores of the many-core processor that implements communication between processes is the same.

It should be noted that the determining processor core may also use other methods to determine the maximum payload that can be sent by the QMC, which is not restricted in the present invention.

After a first process invokes the library function in the MsgLib, the library function in the MsgLib detects whether the size of the message body of the message to be sent by the first process is greater than the maximum payload that can be sent by the QMC.

If it is detected that the size of the message body of the message is greater than the maximum payload that can be sent by the QMC, the message body is stored into the shared memory. In addition, the source processor core is switched from the user state to the kernel state by means of system invoking, and then, the source kernel is accessed.

Optionally, the message body is first written into a cache unit, and after all data of the message body is written into the cache unit, all the data of the message body in the cache unit is written into the shared memory. This can ensure that the message body read from the shared memory is complete and correct.

It should be noted that all the data of the message body may also be directly written into the shared memory, and all the data of the message body may be written into the shared memory in other manners, which is not restricted in the present invention.

Optionally, a size of the shared memory occupied by the message body is a first integer multiple of the size of a Cache Line, where the first integer is an integer greater than 0.

If it is detected that the size of the message body of the message is not greater than the maximum payload that can be sent by the QMC, the source processor core is switched from the user state to the kernel state by means of system invoking, and then the source kernel is accessed.

203. The source kernel writes the message into the QMC.

The source kernel processor executes step 202a, or executes step 202b. If it is detected in step 202b that the message body of the message is greater than the maximum payload that can be carried by the QMC, because the message body of the message is already stored in the shared memory, the source kernel only needs to store information of the message that is used to indicate the message body of the message stored in the shared memory as a message header into the QMC, and send to the target kernel.

Optionally, the message header of the message includes a start address of the message body and the size of the message body stored in the shared memory, where the start address stored in the shared memory is not null, and the start address and the size of the message body are used to indicate the message body stored in the shared memory.

Alternatively, the message header of the message includes a start address and an end address of the message body stored in the shared memory, where the start address and the end address are used to indicate the message body stored in the shared memory, and neither the start address nor the end address is null.

It should be noted that the message header of the message may use other methods to indicate the message body stored in the shared memory, which is not restricted in the present invention.

Further, the message header further includes a first target process identity.

The first target process identity is used to identify the target process that corresponds to the message header.

Further, the message header further includes first data of the message body, so that the target process detects whether the first data of the message body included in the message header is consistent with first data of the message body acquired from the cache; and executes the subsequent processing process of the message body if the two are consistent; may discard, instead of processing, the message body acquired from the cache if the two are inconsistent.

If step 202b is executed and it is detected in step 202b that the message body of the message is not greater than the maximum payload that can be carried by the QMC, the source kernel stores the message body of the message into the QMC, stores the information that is used to indicate the message body of the message stored in the QMC as the message header into the QMC, and sends to the target kernel. That is, both the message header and the message body of the message are stored in the QMC.

It should be noted that, in all embodiments of the present invention, if both the message header and the message body of a message are stored in the QMC, the message is called a small message.

Optionally, the message header of the small message includes the size of the message body and identity information.

The identity information is used to identify that the message body of the message is transmitted through the QMC.

Optionally, the identity information includes information indicating that the start address stored in the shared memory is null.

It should be noted that other information may also be used as the identity information. For example, the size of the message body may be set to a fixed value to serve as the identity information. The present invention is not limited thereto.

Further, the message header of the small message further includes a second target process identity.

204. The source kernel sends an interrupt triggering signal to the target kernel of the target processor core to trigger the target kernel to perform interrupt processing, and the target kernel receives the interrupt triggering signal.

The source kernel may determine, according to a target process identity carried in the message header of the message, the target processor core where the target kernel is located, and send the interrupt triggering signal to the target processor core.

If the message body of the message is stored in the shared memory, the target process identity in the message header of the message is identified as a first target process identity. Then, the source kernel determines a first target processor core according to the first target process identity, and sends a first interrupt triggering signal to the first target processor core. In this case, a target kernel located in the first target processor core receives the first interrupt triggering signal.

If the message body of the message is stored in the QMC, the target process identity in the message header of the message is identified as a second target process identity. Then, the source kernel determines a second target processor core according to the second target process identity, and sends a second interrupt triggering signal to the second target processor core. In this case, a target kernel located in the second target processor core receives the second interrupt triggering signal.

It should be noted that the first interrupt triggering signal and the second interrupt triggering signal may be the same or may be different from each other, which is not restricted in the present invention.

205. The target kernel performs interrupt processing according to the interrupt triggering signal, and dumps the message stored in the QMC to a corresponding message receiving queue.

The target kernel receives the interrupt triggering signal and performs the interrupt processing. In this case, the target processor core stops executing a current process, that is, it switches from the user state to the kernel state.

If the interrupt triggering signal received by the target kernel is a first interrupt triggering signal, it indicates that the message body of the message is stored in the shared memory and the source kernel has stored the message header of the message into the QMC. The target kernel performs interrupt processing according to the first interrupt triggering signal, and in the process of performing first interrupt processing, reads the message header from the QMC and places, according to the first target process identity in the message header, the message header into the message receiving queue that corresponds to the target process.

If the interrupt triggering signal received by the target kernel is a second interrupt triggering signal, it indicates that the message body of the message is stored in the QMC and the source kernel has stored both the message header and the message body of the message into the QMC. That is, the source kernel has stored a small message into the QMC. The target kernel performs second interrupt processing according to the second interrupt triggering signal, and in the process of performing the second interrupt processing, reads the message header and the message body from the QMC and places, according to the second target process identity in the message header, the message header and the message body as a small message into the message receiving queue that corresponds to the target process.

206. The target kernel performs process scheduling after exiting the interrupt processing.

If the interrupt processing performed by the target kernel is first interrupt processing, the target kernel performs process scheduling after exiting the first interrupt processing; if the interrupt processing performed by the target kernel is second interrupt processing, the target kernel performs process scheduling after exiting the second interrupt processing.

After the target kernel performs the process scheduling, if a currently scheduled process is the first process, of the source processor core, which is to send the message, that is, a target process is scheduled, the target kernel finds the message receiving queue of the target process and acquires the message header stored in the message receiving queue.

It should be noted that if the currently scheduled process is not the first process, of the source processor core, which is to send the message, that is, if a third process is scheduled, the target kernel finds a message receiving queue of the third process and acquires the message header stored in the message receiving queue. The processing process is consistent with the processing process in which the target process is scheduled, and the following makes a description by using scheduling of the target process as an example.

207. The target kernel detects whether the message header includes the identity information.

If the message body of the message is stored in the QMC, the message header of the message includes the identity information; if the message body of the message is stored in the shared memory, the message header of the message does not include the identity information.

It should be noted that the following steps to be executed by the target kernel vary according to different results of the detection performed by the target kernel. If the target kernel detects that the message header includes the identity information, step 208*a* is executed; if the target kernel detects that the message header does not include the identity information, steps 208*b* to 209*b* are executed.

208*a*. The target kernel switches to the target process.

If the target kernel detects that the message header includes the identity information, it indicates that the message body of the message is also transmitted to the target kernel through the QMC, and in step 205, the message body is stored in the message receiving queue of the target process.

If a process executed before the interrupt processing is the target process, the target kernel does not need to perform process switching, but only needs to switch from the kernel state to the user state, that is, the target kernel may switch to the target process, and the target process directly acquires the message body from the message receiving queue that corresponds to the target process.

If a process executed before the interrupt processing is not the target process, the target kernel needs to execute a process switching program to switch to the target process, so that the target process directly acquires the message body from the message receiving queue that corresponds to the target process.

208*b*. The target kernel executes a CPU pre-fetching command according to the message header.

When the target kernel does not execute step 207 or when step 207 is executed and the target kernel detects that the message header does not include the identity information, the target kernel executes the CPU pre-fetching command according to the message header, so that the message body is loaded to a cache that corresponds to the target processor core.

If the message header includes the start address of the message body and the size of the message body stored in the shared memory, the target kernel executes the CPU pre-fetching command according to the start address of the message body and the size of the message body stored in the shared memory, so that the target kernel loads the message body, which is in the message stored in the shared memory and corresponds to the message header, from the shared memory to the cache that corresponds to the target processor core.

If the message header includes the start address and the end address of the message body stored in the shared memory, the target kernel executes the CPU pre-fetching command according to the start address and the end address of the message body stored in the shared memory, so that the target kernel loads the message body, which is in the message stored in the shared memory and corresponds to the message header, from the shared memory to the cache that corresponds to the target processor core.

209b. Switch to the target process, so that the target process acquires the message body from the cache.

The target kernel switches to the target process after the target kernel executes the CPU pre-fetching command; optionally, when the message body is loaded to the cache that corresponds to the target processor core, the target kernel switches to the target process simultaneously, so that the target process acquires the message body from the cache.

If a process executed before the interrupt processing is the target process, the target kernel does not need to perform the process switching, but only needs to switch from the kernel state to the user state, that is, the target kernel may switch to the target process, and the target process acquires the message body from the cache.

Optionally, when the message body is loaded to the cache that corresponds to the target processor core, the target kernel switches from the kernel state to the user state simultaneously, that is, switches to the target process.

If a process executed before the interrupt processing is not the target process, the target kernel needs to execute a process switching program to switch to the target process, so that the target process acquires the message body from the cache.

Optionally, when the message body is loaded to the cache that corresponds to the target processor core, the target kernel simultaneously executes the process switching program to switch to the target process.

This embodiment of the present invention provides a method for mutual communication between processes of a many-core processor. A target kernel detects, according to a message header of a message, whether a corresponding message body is transmitted by a QMC. If it is not transmitted by the QMC, the target kernel learns that the message body is stored in a shared memory, executes, according to the acquired message header, a CPU pre-fetching command instructing to load the message body from the shared memory to a cache that corresponds to a target processor core, and switches to a target process, so that the target process acquires the message body from the cache. If the message body is transmitted directly by the QMC, the target kernel switches to the target process, so that the target process acquires the message from a message queue that corresponds to the target process. In this way, during communication between processes, the message body is loaded to the cache, so that the target process may directly acquire the message body from the cache without the need of accessing the shared memory to acquire the message body, thereby increasing the speed of reading the message body and enhancing user experience. In addition, when a size of the message body is not greater than the maximum payload that can be carried by the QMC, the message body is transmitted through the QMC, and then, the target kernel does not need to access the shared memory for transmission but directly acquires the message body from the QMC, thereby further increasing the speed of reading the message body and enhancing the user experience.

Figure 5:
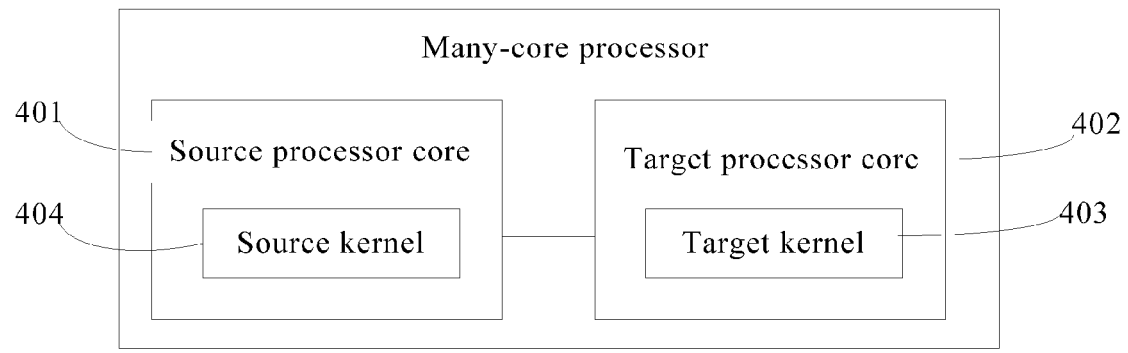
FIG. 5 is a schematic structural diagram of a many-core processor according to an embodiment of the present invention.
Figure 6:
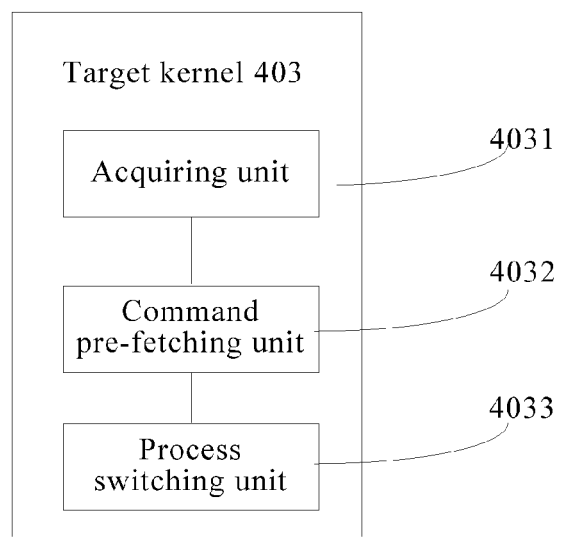
FIG. 6 is a schematic structural diagram of a target kernel shown in FIG. 5.

An embodiment of the present invention provides a many-core processor. As shown in FIG. 5, the many-core processor includes a source processor core 401 and a target processor core 402. The target processor core runs a target kernel 403, and the source processor core 401 runs a source kernel 404. As shown in FIG. 6, the target kernel includes an acquiring unit 4031 configured to acquire a message header of a message from a QMC, where optionally, the message header includes a start address of a message body and a size of the message body stored in a shared memory, and the start address and the size of the message body are used to indicate the message body stored in the shared memory; or the message header includes a start address and an end address of the message body stored in the shared memory, and the start address and the end address are used to indicate the message body stored in the shared memory; a command pre-fetching unit 4032 configured to execute a CPU pre-fetching command according to the message header acquired by the acquiring unit 4031, so that the message body that is in the message stored in the shared memory and corresponds to the message header is loaded to a cache that corresponds to the target processor core; and a process switching unit 4033 configured to switch to a target process after the command pre-fetching unit 4032 executes the CPU pre-fetching command, so that the target process acquires the message body from the cache.

Figure 7:
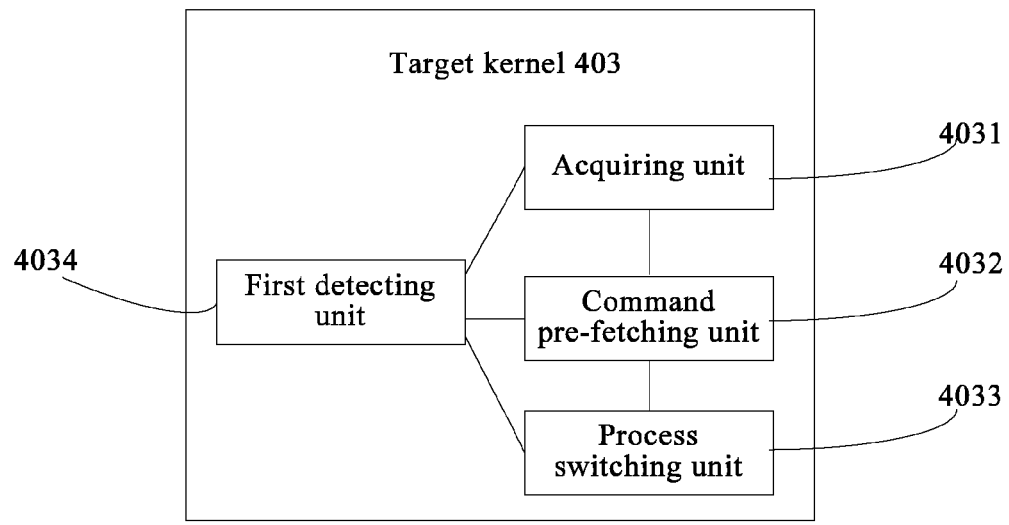
FIG. 7 is another schematic structural diagram of a target kernel shown in FIG. 5.

As shown in FIG. 7, the target kernel 403 further includes the following units.

Optionally, the message header includes identity information, where the identity information is used to identify that the message body of the message is transmitted through the QMC. A first detecting unit 4034 configured to detect whether the message header includes the identity information.

The command pre-fetching unit 4032 is configured to, when the first detecting unit 4034 detects that the message header does not include the identity information, execute the CPU pre-fetching command according to the message header acquired by the acquiring unit 4031.

Figure 8:
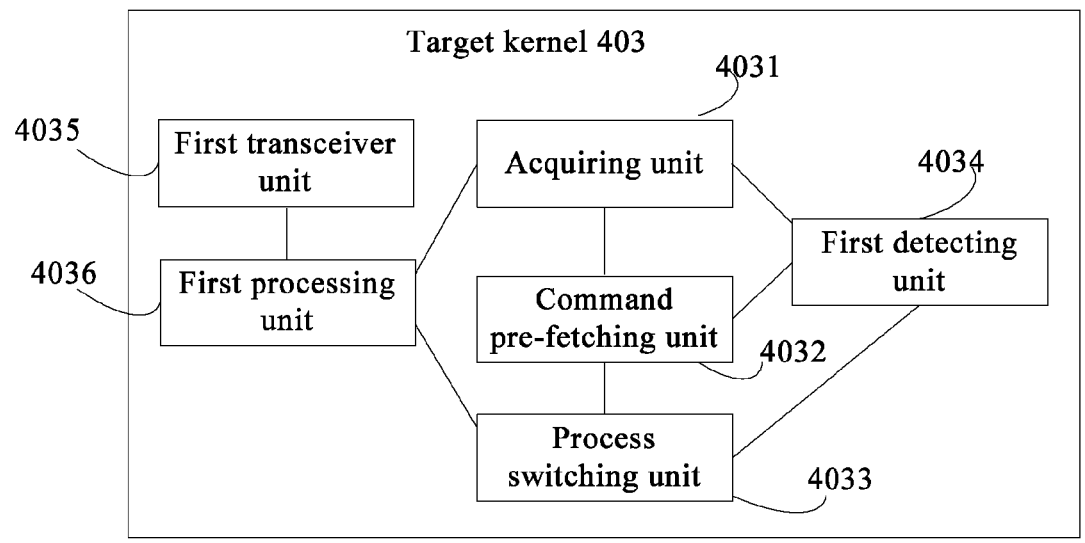
FIG. 8 is another schematic structural diagram of a target kernel shown in FIG. 5.

Further, as shown in FIG. 8, the target kernel 403 further includes a first transceiver unit 4035 configured to receive a first interrupt triggering signal sent by the source kernel 404; and a first processing unit 4036 configured to perform first interrupt processing according to the first interrupt triggering signal received by the first transceiver unit 4035.

The message header further includes a first target process identity used to identify the target process that corresponds to the message header.

The acquiring unit 4031 is configured to, when the first processing unit 4036 is performing the first interrupt processing, read the message header from the QMC and place, according to the first target process identity in the message header, the message header into a message receiving queue that corresponds to the target process.

Further, when the message body of the message is stored in the shared memory, the message header further includes first data of the message body, so that the target process detects whether the first data of the message body included in the message header is consistent with first data of the message body acquired from the cache; and executes the subsequent processing process of the message body if the two are consistent; may discard, instead of processing, the message body acquired from the cache if the two are inconsistent.

The first processing unit 4036 is further configured to perform process scheduling after exiting the first interrupt processing.

The acquiring unit 4031 is configured to acquire the message header from the message receiving queue that corresponds to the target process when the first processing unit 4036 schedules the target process.

The process switching unit 4033 is configured to switch to the target process when the first detecting unit 4034 detects that the message header includes the identity information, so that the target process acquires, from the QMC, the message body that is in the message and corresponds to the message header.

Further, the message header further includes a second target process identity.

Figure 9:
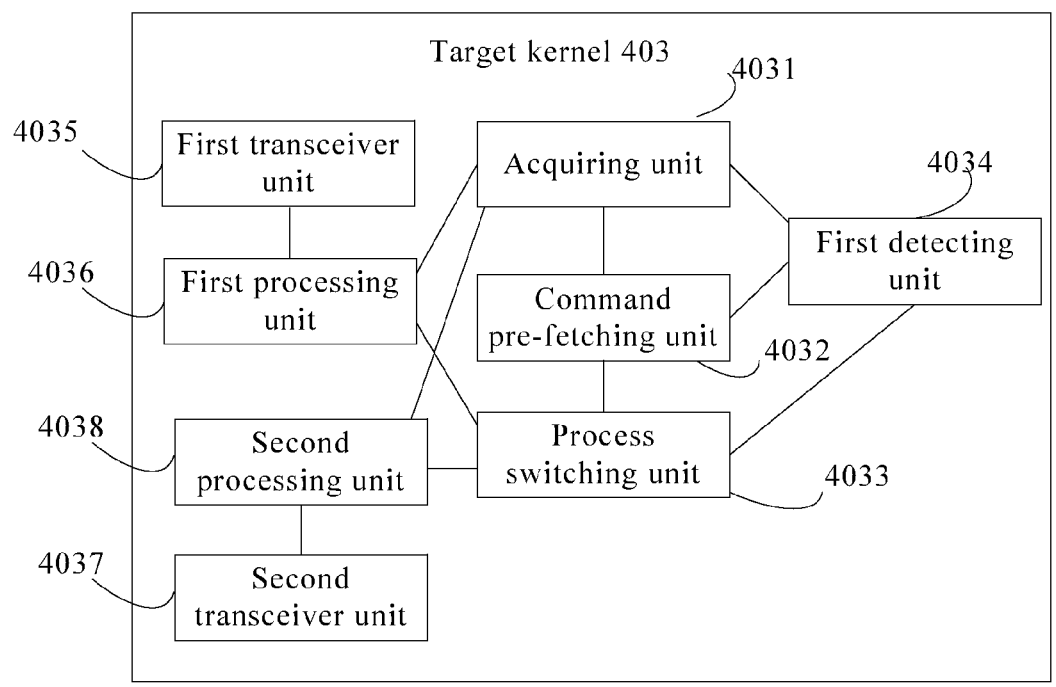
FIG. 9 is another schematic structural diagram of a target kernel shown in FIG. 5.

As shown in FIG. 9, the target kernel further includes a second transceiver unit 4037 configured to receive a second interrupt triggering signal sent by the source kernel 404; and a second processing unit 4038 configured to perform second interrupt processing according to the second interrupt triggering signal received by the second transceiver unit 4037.

The acquiring unit 4031 is configured to, when the second processing unit 4038 is performing the second interrupt processing, read the message header and the message body from the QMC and place, according to the second target process identity in the message header, the message header and the message body into the message receiving queue that corresponds to the target process.

The second processing unit 4038 is further configured to perform process scheduling after exiting the second interrupt processing.

The process switching unit 4033 is further configured to switch to the target process when the first detecting unit 4034 detects that the message header includes the identity information and the second processing unit 4038 schedules the target process, so that the target process acquires the message body from the message receiving queue that corresponds to the target process.

It should be noted that the first processing unit and the second processing unit may be integrated into one processing unit, or separately set as two processing units. The first transceiver unit and the second transceiver unit may be integrated into one transceiver unit, or separately set as two transceiver units. The present invention is not limited thereto.

Figure 10:
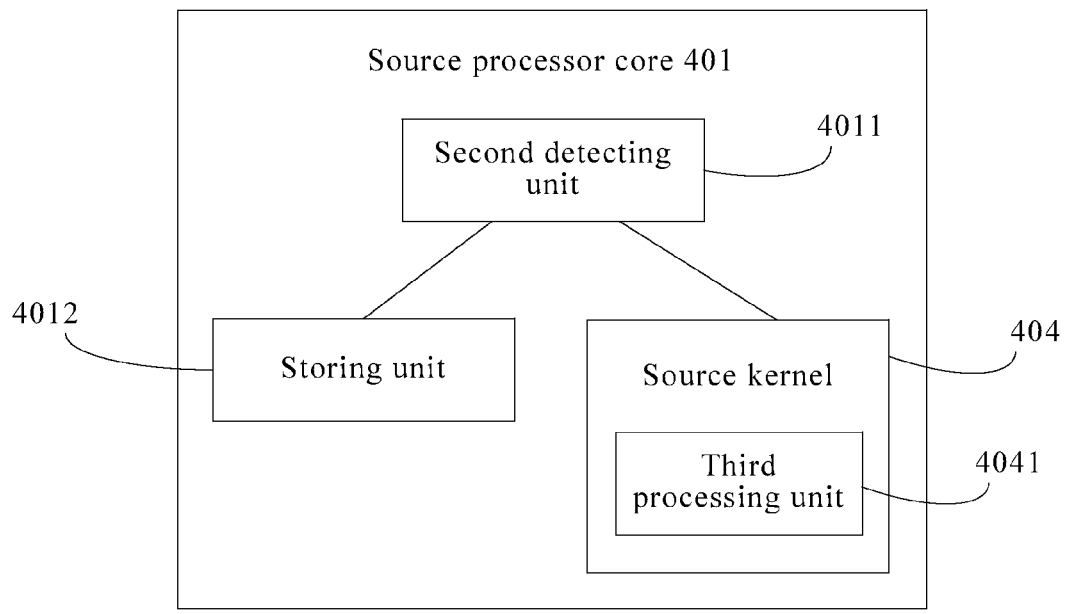
FIG. 10 is a schematic structural diagram of a source processor core shown in FIG. 5.

As shown in FIG. 10, the source processor core 401 includes a second detecting unit 4011 configured to detect whether the size of the message body is greater than the maximum payload that can be sent by the QMC; and a storing unit 4012 configured to store the message body into the shared memory when the second detecting unit 4011 detects that the size of the message body is greater than the maximum payload that can be sent by the QMC.

The storing unit 4012 is configured to write all data of the message body into a cache unit, and write all the data of the message body in the cache unit into the shared memory.

Optionally, a size of the shared memory occupied by the message body is a first integer multiple of a size of a cache line; and the first integer is an integer greater than 0.

As shown in FIG. 10, the source kernel 404 includes a third processing unit 4041 configured to store information that is used to indicate the message body of the message stored in the shared memory as the message header into the QMC, and send to the target kernel.

The third processing unit 4041 is further configured to store the message body into the QMC if the detecting unit 4011 of the source processor core 401 detects that the size of the message body is not greater than the maximum payload that can be sent by the QMC; and store information that is used to indicate the message body of the message stored in the QMC as the message header into the QMC, and send to the target kernel.

If the size of the message body of the message is greater than the maximum payload that can be carried by the QMC, the message header is used to indicate the message body stored in the shared memory; if the size of the message body of the message is not greater than the maximum payload that can be carried by the QMC, the message header is used to indicate the message body of the message stored in the QMC.

An embodiment of the present invention provides a many-core processor. A target kernel of a target processor core transmits a message header from a QMC, and stores the message header into a message receiving queue that corresponds to a target process. The target kernel detects, according to the message header of a message, whether a corresponding message body is transmitted by the QMC. If it is not transmitted by the QMC, the target kernel learns that the message body is stored in a shared memory, executes, according to the acquired message header, a CPU pre-fetching command instructing to load the message body from the shared memory to a cache that corresponds to the target processor core, and switches to the target process, so that the target process acquires the message body from the cache. If the message body is transmitted directly by the QMC, the target kernel switches to the target process, so that the target process acquires the message from a message queue that corresponds to the target process. In this way, during communication between processes, the message body is loaded to the cache, so that the target process may directly acquire the message body from the cache without the need of accessing the shared memory to acquire the message body, thereby increasing the speed of reading the message body and enhancing user experience. In addition, when a size of the message body is not greater than the maximum payload that can be carried by the QMC, the message body is transmitted through the QMC, and the target kernel does not need to access the shared memory for transmission but directly acquires the message body from the QMC, thereby further increasing the speed of reading the message body and further enhancing the user experience.

Figure 11:
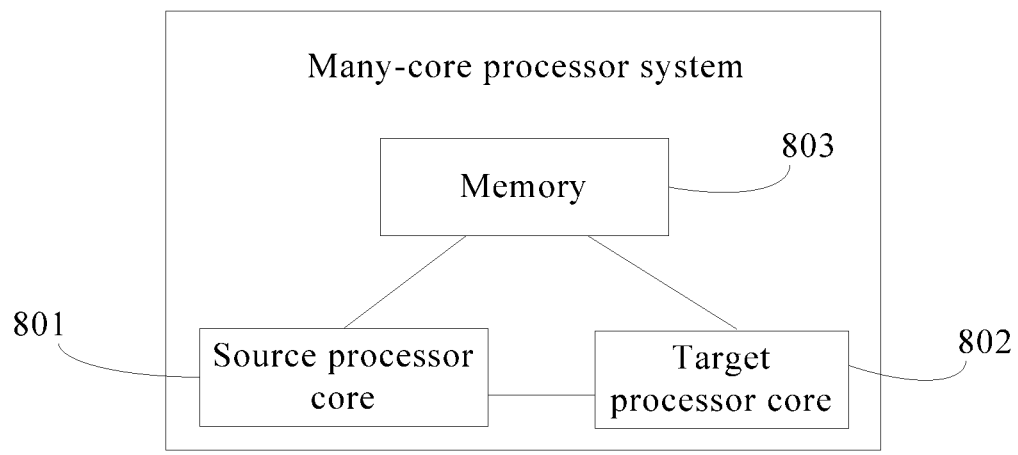
FIG. 11 is a schematic structural diagram of a many-core processor system according to an embodiment of the present invention.

An embodiment of the present invention provides a many-core processor system. As shown in FIG. 11, the many-core processor system includes a source processor core 801, a target processor core 802, and a memory 803.

The memory 803 is configured to store codes that are run by the source processor core and the target processor core.

The target processor core 802 is configured to read the codes stored in the memory 803, so that a target kernel executes the following method by running a kernel program: acquiring, by the target kernel, a message header of a message from a QMC.

Optionally, the message header includes a start address of a message body and a size of the message body stored in a shared memory, and the start address and the size of the message body are used to indicate the message body stored in the shared memory; or the message header includes a start address and an end address of the message body stored in the shared memory, and the start address and the end address are used to indicate the message body stored in the shared memory.

The target kernel further executes a CPU pre-fetching command according to the message header, so that the message body that is in the message stored in the shared memory and corresponds to the message header is loaded to a cache that corresponds to the target processor core.

The target kernel further switches to a target process, so that the target process acquires the message body from the cache.

Further, the message header includes identity information, where the identity information is used to indicate that the message body of the message is transmitted through the QMC.

In this case, the target kernel further detects whether the message header includes the identity information.

If it is detected that the message header does not include the identity information, the CPU pre-fetching command is executed according to the message header.

Further, the target kernel further receives a first interrupt triggering signal sent by the source processor core 801, and performs first interrupt processing according to the received first interrupt triggering signal.

The message header further includes a first target process identity used to identify the target process that corresponds to the message header.

In the process of performing the first interrupt processing, the target kernel further reads the message header from the QMC and places, according to the first target process identity in the message header, the message header into a message receiving queue that corresponds to the target process.

Further, when the message body of the message is stored in the shared memory, the message header further includes a part of data of the message body, so that the target process detects, according to the part of data of the message body, the message body acquired from the cache.

The target kernel further performs process scheduling after exiting the first interrupt processing.

When scheduling the target process, the target kernel acquires the message header from the message receiving queue that corresponds to the target process.

If it is detected that the message header includes the identity information, the target kernel switches to the target process, so that the target process acquires, from the QMC, the message body that is in the message and corresponds to the message header.

Further, the message header further includes a second target process identity.

In this case, the target kernel further receives a second interrupt triggering signal sent by the source processor core 801, and performs second interrupt processing according to the received second interrupt triggering signal.

In the process of performing the second interrupt processing, the target kernel reads the message header and the message body from the QMC, and places, according to the second target process identity in the message header, the message header and the message body into the message receiving queue that corresponds to the target process.

The target kernel further performs process scheduling after exiting the second interrupt processing.

When scheduling the target process, the target kernel switches to the target process, so that the target process acquires the message body from the message receiving queue that corresponds to the target process.

The source processor core 801 is configured to read the codes stored in the memory 803, so that a source kernel executes the following method by running a kernel program: detecting, by the source processor core 801, whether the size of the message body is greater than the maximum payload that can be sent by the QMC.

The message body is stored into the shared memory if it is detected that the size of the message body is greater than the maximum payload that can be sent by the QMC.

Optionally, the source processor core 801 executes the following: writing all data of the message body into a cache unit, and then writing all the data of the message body in the cache unit into the shared memory.

Optionally, a size of the shared memory occupied by the message body is a first integer multiple of a size of a cache line; and the first integer is an integer greater than 0.

The source kernel stores information that is used to indicate the message body of the message stored in the shared memory as the message header into the QMC, and sends to the target kernel.

The source kernel further executes the following: storing the message body into the QMC if it is detected that the size of the message body is not greater than the maximum payload that can be sent by the QMC; and storing the information that is used to indicate the message body of the message stored in the QMC as the message header into the QMC, and sending to the target kernel.

If the size of the message body of the message is greater than the maximum payload that can be carried by the QMC, the message header is used to indicate the message body stored in the shared memory; if the size of the message body of the message is not greater than the maximum payload that can be carried by the QMC, the message header is used to indicate the message body of the message stored in the QMC.

An embodiment of the present invention provides a many-core processor system. A target kernel of a target processor core transmits a message from a QMC, and stores the message into a message receiving queue that corresponds to a target process. The target kernel detects, according to a message header of the message, whether a corresponding message body is transmitted by the QMC. If it is not transmitted by the QMC, the target kernel learns that the message body is stored in a shared memory, executes, according to the acquired message header, a CPU pre-fetching command instructing to load the message body from the shared memory to a cache that corresponds to the target processor core, and switches to the target process, so that the target process acquires the message body from the cache. If the message body is transmitted directly by the QMC, the target kernel switches to the target process, so that the target process acquires the message from a message queue that corresponds to the target process. In this way, during communication between processes, the message body is loaded to the cache, so that the target process may directly acquire the message body from the cache without the need of accessing the shared memory to acquire the message body, thereby increasing the speed of reading the message body and enhancing user experience. In addition, when a size of the message body is not greater than the maximum payload that can be carried by the QMC, the message body is transmitted through the QMC, and then the target kernel does not need to access the shared memory for transmission but directly acquires the message body from the QMC, thereby further increasing the speed of reading the message body and further enhancing the user experience.

A person of ordinary skill in the art should understand that all or part of the steps of the foregoing method embodiments may be implemented by a program instructing relevant hardware. The foregoing program may be stored in a computer readable storage medium. When the program runs, the foregoing steps included in the method embodiments are performed. The foregoing storage medium may be any medium capable of storing program codes, such as a read-only memory (ROM), a random-access memory (RAM), a magnetic disk, or an optical disk.

The foregoing description is merely about specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for mutual communication between processes of a many-core processor, wherein the method is executed by a target kernel, the target kernel is running in a target processor core, and the method comprises:
   acquiring a message header of a message from a source kernel through a message channel, wherein the message header includes a start address of a message body and a size of the message body, or a start address and an end address of the message body;
   executing a central processing unit (CPU) pre-fetching command according to the message header such that a message body of the message that is stored in a shared memory and corresponds to the message header is loaded to a cache of the target processor core; and
   switching to a target process such that the target process acquires the message body from the cache.

2. The method according to claim 1, wherein the message header comprises a start address of the message body and a size of the message body stored in the shared memory, and the start address and the size of the message body are used to indicate the message body stored in the shared memory, or wherein the message header comprises a start address and an end address of the message body stored in the shared memory, and the start address and the end address are used to indicate the message body stored in the shared memory.

3. The method according to claim 1, wherein the message header comprises identity information, and the identity information is used to indicate that the message body of the message is transmitted through the message channel.

4. The method according to claim 3, wherein before executing the CPU pre-fetching command according to the message header, the method further comprises detecting whether the message header comprises the identity information, and wherein executing the CPU pre-fetching command according to the message header comprises executing the CPU pre-fetching command according to the message header when it is detected that the message header does not comprise the identity information.

5. The method according to claim 4, further comprising switching to the target process when it is detected that the message header comprises the identity information such that the target process acquires, from the message channel, the message body that is in the message and corresponds to the message header.

6. The method according to claim 5, wherein the message header further comprises a second target process identity, wherein before acquiring the message header of the message from the message channel, the method comprises receiving a second interrupt triggering signal sent by the source kernel, performing second interrupt processing according to the second interrupt triggering signal, and in a process of performing the second interrupt processing, reading the message header and the message body from the message channel and placing, according to the second target process identity in the message header, the message header and the message body into a message receiving queue that corresponds to the target process, and performing process scheduling after exiting the second interrupt processing, and wherein switching to the target process when it is detected that the message header comprises the identity information such that the target process acquires, from the message channel, the message body that is in the message and corresponds to the message header comprises switching to the target process when it is detected that the message header comprises the identity information and when the target process is being scheduled such that the target process acquires the message body from the message receiving queue that corresponds to the target process.

7. The method according to claim 1, wherein the message header comprises a first target process identity used to identify the target process that corresponds to the message header, wherein before acquiring the message header of the message from the message channel, the method further comprises receiving a first interrupt triggering signal sent by a source kernel, performing first interrupt processing according to the first interrupt triggering signal, and in a process of performing the first interrupt processing, reading the message header from the message channel and placing, according to the first target process identity in the message header, the message header into a message receiving queue that corresponds to the target process, and performing process scheduling after exiting the first interrupt processing, and wherein acquiring the message header of the message from the message channel comprises acquiring the message header from the message receiving queue that corresponds to the target process when the target process is being scheduled.

8. The method according to claim 1, wherein the message header comprises first data of the message body, and wherein the method further comprises:
   detecting, by the target process, whether the first data of the message body comprised in the message header is consistent with first data of the message body that is acquired from the cache; and
   executing a subsequent processing process of the message body when the two are consistent.

9. The method according to claim 1, wherein the message body is sent by a source processor core by using the following method: detecting whether the size of the message body is greater than a maximum payload that can be sent by the message channel; and when it is detected that the size of the message body is greater than the maximum payload that can be sent by the message channel, storing, by the source processor core, the message body into the shared memory; and storing, by the source kernel, information that is used to indicate the message body of the message stored in the shared memory as the message header into the message channel, and sending to the target kernel; when it is detected that the size of the message body is not greater than the maximum payload that can be sent by the message channel, storing, by the source kernel, the message body of the message into the message channel; and storing information that is used to indicate the message body of the message stored in the message channel as the message header into the message channel, and sending to the target kernel.

10. The method according to claim 9, wherein when it is detected that the size of the message body is greater than the maximum payload that can be sent by the message channel, storing the message body in the shared memory comprises writing all data of the message body into a cache unit, and writing all the data of the message body in the cache unit into the shared memory.

11. The method according to claim 9, wherein a size of the shared memory occupied by the message body is a first integer multiple of a size of a cache line, and the first integer is an integer greater than 0.

12. A many-core processor, comprising:
a source processor core; and
a target processor core,
wherein the target processor core runs a target kernel, and wherein the target kernel comprises:
an acquiring unit configured to acquire a message header of a message from a source kernel through a message channel, wherein the message header includes a start address of a message body and a size of the message body, or a start address and an end address of the message body;
a command pre-fetching unit configured to execute a central processing unit (CPU) pre-fetching command according to the message header acquired by the acquiring unit such that a message body of the message that is stored in a shared memory and corresponds to the message header is loaded to a cache of the target processor core; and
a process switching unit configured to switch to a target process after the command pre-fetching unit executes the CPU pre-fetching command such that the target process acquires the message body from the cache.

13. The many-core processor according to claim 12, wherein the message header comprises a start address of the message body and a size of the message body stored in the shared memory, and the start address and the size of the message body are used to indicate the message body stored in the shared memory, or wherein the message header comprises a start address and an end address of the message body stored in the shared memory, and the start address and the end address are used to indicate the message body stored in the shared memory.

14. The many-core processor according to claim 12, wherein the message header comprises identity information, and the identity information is used to indicate that the message body of the message is transmitted through the message channel.

15. The many-core processor according to claim 14, wherein the target kernel further comprises a first detecting unit configured to detect whether the message header comprises the identity information, and wherein the command pre-fetching unit is configured to, when the first detecting unit detects that the message header does not comprise the identity information, execute the CPU pre-fetching command according to the message header acquired by the acquiring unit.

16. The many-core processor according to claim 15, wherein the process switching unit is configured to switch to the target process when the first detecting unit detects that the message header comprises the identity information such that the target process acquires, from the message channel, the message body that is in the message and corresponds to the message header.

17. The many-core processor according to claim 16, wherein the message header further comprises a second target process identity, wherein the target kernel further comprises: a second transceiver unit configured to receive a second interrupt triggering signal sent by the source kernel; and a second processing unit configured to perform second interrupt processing according to the second interrupt triggering signal received by the second transceiver unit, wherein the acquiring unit is configured to, when the second processing unit is performing the second interrupt processing, read the message header and the message body from the message channel and place, according to the second target process identity in the message header, the message header and the message body into a message receiving queue that corresponds to the target process, wherein the second processing unit is further configured to perform process scheduling after exiting the second interrupt processing, and wherein the process switching unit is configured to switch to the target process when the first detecting unit detects that the message header comprises the identity information and when the second processing unit is scheduling the target process such that the target process acquires the message body from the message receiving queue that corresponds to the target process.

18. The many-core processor according to claim 12, wherein the message header comprises a first target process identity used to identify the target process that corresponds to the message header, wherein the target kernel further comprises: a first transceiver unit configured to receive a first interrupt triggering signal sent by a source kernel; and a first processing unit configured to perform first interrupt processing according to the first interrupt triggering signal received by the first transceiver unit, wherein the acquiring unit is configured to, when the first processing unit is performing the first interrupt processing, read the message header from the message channel and place, according to the first target process identity in the message header, the message header into a message receiving queue that corresponds to the target process, wherein the first processing it is further configured to perform process scheduling after exiting the first interrupt processing, and wherein the acquiring unit is configured to acquire the message header from the message receiving queue that corresponds to the target process when the first processing unit is scheduling the target process.

19. The many-core processor according to claim 12, wherein the source processor core comprises: a second detecting unit configured to detect whether the size of the message body is greater than a maximum payload that can be sent by the message channel; and a storing unit configured to store the message body into the shared memory when the second detecting unit detects that the size of the message body is greater than the maximum payload that can be sent by the message channel, wherein the source kernel comprises a third processing unit configured to store information that is used to indicate the message body of the message stored in the shared memory as the message header into the message channel, and send to the target kernel, and wherein the third processing unit is further configured to store the message body into the message channel when the detecting unit of the source processor core detects that the size of the message body is not greater than the maximum payload that can be sent by the message channel, and store information that is used to indicate the message body of the message stored in the message channel as the message header into the message channel, and send to the target kernel.

20. The many-core processor according to claim 19, wherein the storing unit is configured to write all data of the message body into a cache unit, and write all the data of the message body in the cache unit into the shared memory.

21. The many-core processor according to claim 19, wherein a size of the shared memory occupied by the message body is a first integer multiple of a size of a cache line, and the first integer is an integer greater than 0.

22. A many-core processor system, comprising:
a source processor core;
a target processor core; and
a memory,
wherein the memory is configured to store codes that are required for running of the source processor core and the target processor core, and
wherein the target processor core is configured to read the codes stored in the memory such that a target kernel executes the following method by running a kernel program:
acquiring a message header of a message from a source kernel through a message channel, wherein the message header includes a start address of a message body and a size of the message body, or a start address and an end address of the message body;
executing a central processing unit (CPU) pre-fetching command according to the message header such that a message body of the message that is stored in a shared memory and corresponds to the message header is loaded to a cache of the target processor core; and
switching to a target process such that the target process acquires the message body from the cache.

* * * * *